US 12,163,477 B2

(12) United States Patent
Fernandez et al.

(10) Patent No.: US 12,163,477 B2
(45) Date of Patent: Dec. 10, 2024

(54) TURBOMACHINE COMPRISING A SPEED REDUCTION GEAR AND AT LEAST ONE ELECTRIC MACHINE

(71) Applicant: SAFRAN TRANSMISSION SYSTEMS, Colombes (FR)

(72) Inventors: Maxime Fernandez, Moissy-Cramayel (FR); Yohan Douy, Moissy-Cramayel (FR); Boris Pierre Marcel Morelli, Moissy-Cramayel (FR); Jordane Emile André Peltier, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/427,543

(22) Filed: Jan. 30, 2024

(65) Prior Publication Data

US 2024/0254924 A1    Aug. 1, 2024

(30) Foreign Application Priority Data

Jan. 31, 2023    (FR) .................................. FR2300890

(51) Int. Cl.
*B64D 35/025*    (2024.01)
*B64C 11/48*    (2006.01)
(Continued)

(52) U.S. Cl.
CPC ................ *F02C 7/36* (2013.01); *B64C 11/48* (2013.01); *B64C 27/12* (2013.01); *B64D 35/022* (2024.01);
(Continued)

(58) Field of Classification Search
CPC ........ F01D 15/12; F01D 13/00; F01D 13/003; F01D 15/08; F01D 15/10; F02C 7/32;
(Continued)

(56) References Cited

U.S. PATENT DOCUMENTS 10,180,080 B2 *   1/2019   Munevar .................... H02P 3/06
10,400,858 B2 *   9/2019   Mitrovic .................... F16H 1/20
(Continued)

FOREIGN PATENT DOCUMENTS

EP    3 356 699 B1    5/2020
FR    3 073 569 A1    5/2019

OTHER PUBLICATIONS

French Search Report & Written Opinion mailed Jul. 15, 2023, issued in corresponding French Application No. FR2300890, filed Jan. 31, 2023, 7 pages total.

*Primary Examiner* — Brian P Wolcott
*Assistant Examiner* — Behnoush Haghighian
(74) *Attorney, Agent, or Firm* — Christensen O'Connor Johnson Kindness PLLC (57) ABSTRACT

The disclosure relates to an assembly for an aircraft turbomachine, having a speed reduction gear comprising an input pinion connected to a power shaft of the turbomachine and an output pinion connected to a propeller shaft of the turbomachine. According to the disclosure, the assembly includes two electric machines which are each configured to provide electrical power to the propeller shaft or to draw mechanical power from the propeller shaft, each electric machine comprising a rotor and a stator, the stator configured to be connected to a casing of the turbomachine. The speed reduction gear can include two substantially parallel intermediate transmission lines configured to transmit the torque from the input pinion to the output pinion, each rotor being driven in rotation respectively by a pinion of an intermediate line.

11 Claims, 7 Drawing Sheets

(51) Int. Cl.
  *B64C 27/12* (2006.01)
  *F02C 7/36* (2006.01)
  *B64D 35/022* (2024.01)
  *F01D 15/12* (2006.01)
  *F02C 7/32* (2006.01)
  *F02K 5/00* (2006.01)

(52) U.S. Cl.
  CPC ............ *B64D 35/025* (2024.01); *F01D 15/12* (2013.01); *F02C 7/32* (2013.01); *F02K 5/00* (2013.01)

(58) Field of Classification Search
  CPC ... F02C 7/268; F02C 7/36; F02K 5/00; B64D 27/33; B64D 35/00; B64D 35/02; B64D 35/021; B64D 35/022; B64D 35/023; B64D 35/024; B64D 35/025; B64D 35/026; B64D 35/04; B64D 35/06; B64D 35/08; H02P 7/343; H02P 9/008
  See application file for complete search history.

(56) References Cited

U.S. PATENT DOCUMENTS

| | | | |
|---|---|---|---|
| 10,443,697 B2 * | 10/2019 | Feraud | F16H 1/20 |
| 11,530,033 B2 * | 12/2022 | Preisser | B64C 27/14 |
| 2017/0260872 A1 * | 9/2017 | Munevar | F01D 21/006 |
| 2017/0321787 A1 * | 11/2017 | Feraud | E04H 4/0043 |
| 2018/0372197 A1 * | 12/2018 | Mathieu | F01D 25/18 |
| 2020/0407052 A1 * | 12/2020 | Preisser | B64C 27/14 |

* cited by examiner

TURBOMACHINE COMPRISING A SPEED REDUCTION GEAR AND AT LEAST ONE ELECTRIC MACHINE

CROSS-REFERENCE TO RELATED APPLICATION

This application claims priority to FR 2300890, filed Jan. 31, 2023, the disclosure of which is hereby expressly incorporated by reference herein in its entirety.

BACKGROUND

The present disclosure relates to the general field of aeronautics. It relates in particular to an assembly for a turbomachine equipped with a mechanical speed reduction gear and at least one electric machine cooperating with the mechanical reduction gear.

The role of a mechanical reduction gear is to modify the speed and torque ratio between the input axle and the output axle of a mechanical system.

Aircraft equipped with turboprop engines are generally equipped with a mechanical reduction gear (referred by the acronym "PGB" for Propeller Gear Box) which allows the engine to adapt the speed of rotation between the turbine and the propeller while allowing it to generate an offset between the axis of rotation of the propeller and the axis of rotation of the turbine. This offset, also referred to as the "Offset", ensures that the air inlet is well integrated vertically under the reduction gear.

There are several possible solutions for improving the performance and efficiency of these turboprop engines during certain phases of flight (take-off, taxiing, etc.). One of these solutions is to hybridize the turboprop engine by adding an electric machine (in motor mode) to the reduction gear to provide additional power during the flight phases concerned. It is also possible to use this electric machine (in generator mode) to recover energy during certain phases of flight.

There are several reduction gear architectures. In the prior art of turboprop engines, reduction gears are of the planetary type with offset or epicyclic with offset. There are also architectures referred to as compound architectures.

In a planetary offset reduction gear, the planet carrier is stationary and the ring gear forms the output shaft of the device, which rotates in the opposite orientation to the sun gear.

In an offset epicyclic reduction gear, the ring gear is stationary and the planet carrier is the output shaft of the device, which rotates in the same orientation as the sun gear.

In a compound reduction gear, no element is attached in rotation and the power is divided between two parallel intermediate lines. The output wheel turns in the same orientation as the input pinion.

An offset epicyclic reduction gear comprises an input pinion which meshes with a wheel in stage 1, which in turn drives a central pinion referred to as a sun gear which meshes with pinions referred to as planet gears, which in turn meshes with a ring gear. The planet gears are maintained by a chassis referred to as a planet carrier. The sun gear, the ring gear and the planet carrier are planetaries because their axes of revolution coincide with the longitudinal axis X of the propeller. The planet gears each have a different axis of revolution equally distributed on the same operating diameter around the axis of the planetaries. These axes are parallel to the longitudinal axis X.

A compound reduction gear comprises an input pinion, from which two intermediate pinions (referred to as idlers) draw power. The idler pinions then drive the output line by means of a second set of toothings. By adjusting the number of teeth on the various pinions, it is possible to obtain a speed reduction ratio between the input line and the output line.

The reduction gears can consist of one or more meshing stages. This meshing occurs in different ways such as by contact, friction or magnetic field.

There are several types of contact meshing such as straight, helical, or herringbone toothings.

Figure 1:
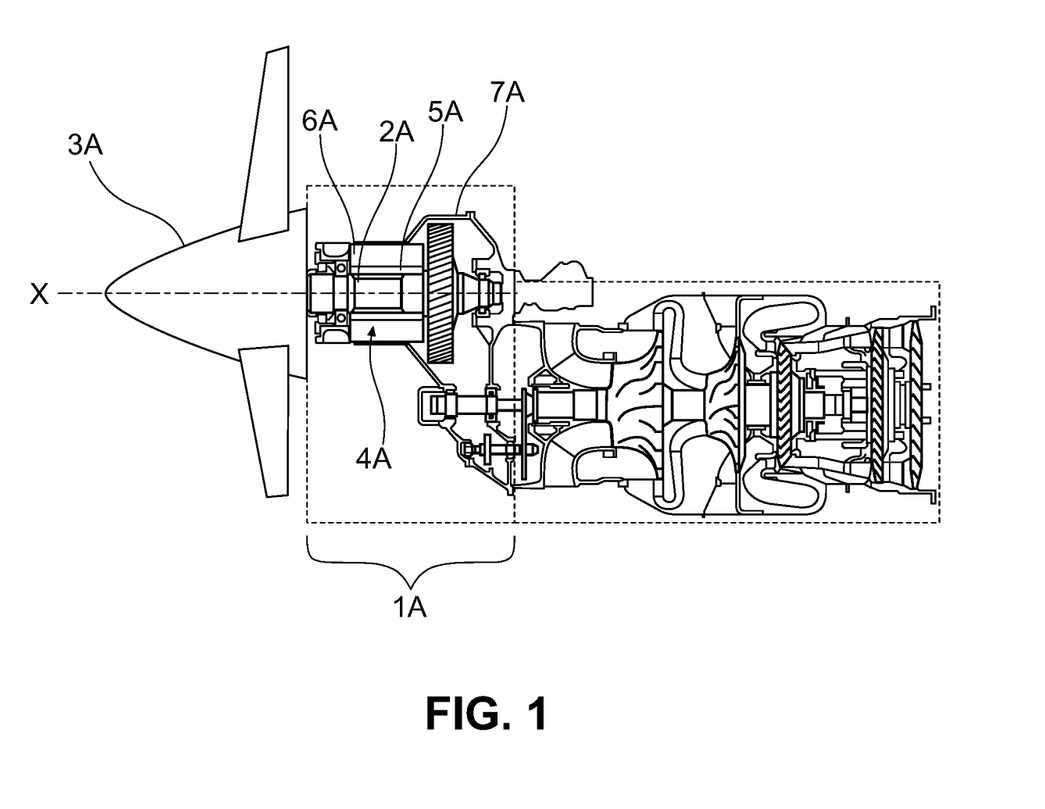
FIG. 1 shows an example of a turboprop engine comprising a reduction mechanism and an electric machine according to the prior art.

The patent documents FR-B1-3073569 and EP-B1-3201492 each describe a speed reduction gear 1A allowing for driving the shaft 2A of a propeller 3A of a turboprop engine in rotation as shown in FIG. 1. The speed reduction gear 1A is equipped with an electric machine 4A designed to provide electrical power to the aircraft. The electric machine 4A is arranged in the volume dedicated to the speed reduction gear 1A so as not to impact the overall dimension in this area of the turboprop engine. The electric machine 4A comprises a hollow rotor 5A which is detachably connected to the shaft 2A of the propeller and coaxial with it. In particular, the shaft 2A of the propeller passes through the rotor 5A. The electric machine 1A comprises a stator 6A which is connected to a stator casing 7A of the turboprop engine. The stator casing 7A surrounds the shaft 2A and comprises a bore in which the stator 6A is mounted. The latter extends outside the rotor 6A. The configuration of the electric machine is compact. However, this type of integration is viable as long as the level of electrical power required by the items of equipment of the aircraft remains moderate. The more powerful the electric machine, the greater its volume, which can severely limit its integration within the speed reduction gear. Yet more and more items of equipment are powered by electrical energy to reduce their environmental impact.

The turbomachine can be equipped with several electric machines, as shown in document U.S. Pat. No. 10,180, 080B1, to increase the electrical power, which can have an impact on the overall dimensions of the stator casing and of the nacelle surrounding the gas generator of the turboprop engine.

Furthermore, when the speed reduction gear is of the compound type, it is necessary to balance the loads between the two intermediate lines, as provided for in patent documents EP-B1-3356699, FR-A1-3035163 and EP-A1-3274609, because the distribution between the lines is not equitable. However, these documents do not take into account the integration of electric machines in relation to the speed reduction gear and, in particular, their load balancing. The configurations in these documents generally provide for a hydraulic balancing or flexibility on the shafts to balance the loads.

There is a need to resolve some or all of the above disadvantages.

SUMMARY

The aim of the present disclosure is to provide a simple and economical solution allowing for integrating two electric machines in cooperation with a speed reduction gear without impacting the overall dimension and configuration of the nearby members.

This is achieved in accordance with the disclosure by an assembly for an aircraft turbomachine, the assembly comprising:

a power shaft;

a propeller shaft centered on a longitudinal axis X and designed and configured to drive at least one propeller of the turbomachine; and at least one speed reduction gear intended and configured to be driven by the power shaft and to drive the propeller shaft in rotation at a speed different from that of the power shaft, the speed reduction gear comprising an input pinion connected to the power shaft and an output pinion connected to the propeller shaft, the assembly comprising two electric machines which are each configured to provide electrical power to the propeller shaft or to draw mechanical power from the propeller shaft, each electric machine comprising a rotor and a stator, the stator being intended and configured to be connected to a casing of the turbomachine; and the speed reduction gear comprising two intermediate transmission lines which are substantially parallel and which are configured to transmit the torque from the input pinion to the output pinion, each rotor being driven in rotation respectively by a pinion of an intermediate line.

Thus, this solution achieves the above-mentioned objective. In particular, by arranging two electric machines, each rotor of which is driven by a respective intermediate line, the total electrical power of the two electric machines can be distributed over two separate lines. This also regulates the load imbalances between the two transmission lines while limiting axial overall dimension. More specifically, the two electric machines create a balancing system. With two electric machines, it is possible to inject slightly more power into the less heavily loaded line and slightly less power into the more heavily loaded line, so that the loads between the two lines balance out. A reverse imbalance in the power provided can be created. Added to this is the fact that the configuration of the electric machines and the compound reduction gear means that the radial and axial overall dimensions are not affected.

The assembly also comprises one or more of the following characteristics, taken alone or in combination:

the input pinion comprises an input axis offset with respect to an output axis of the output pinion.

each intermediate transmission line comprises a first intermediate pinion mounted to rotate about an axis of rotation and comprising a first toothing intended and configured to mesh with an external toothing of the input pinion.

each intermediate transmission line comprises a second intermediate pinion mounted to rotate about an axis of rotation and comprising a second toothing intended and configured to mesh with an external toothing of the output pinion.

the input pinion meshes with two first intermediate pinions of the intermediate transmission lines and the output pinion meshes with two second intermediate pinions of the intermediate transmission lines and in that each first intermediate pinion and each second intermediate pinion comprises a first propeller and a second propeller, each meshing with a corresponding propeller of the input pinion and of the output pinion.

the speed reduction gear comprises at least two drive wheels which are each, on the one hand, driven in rotation respectively by the first intermediate pinion of an intermediate transmission line and which, on the other hand, drive in rotation a complementary pinion mounted on each rotor, the complementary pinion of the rotor comprising an axis of rotation parallel to the input axis and parallel to the axis of the drive wheel.

each drive wheel comprises a first external toothing meshing with an external toothing of a first intermediate pinion and a second external toothing meshing with an external toothing of the complementary pinion.

the stator extends radially outwards from the rotor.

the electric machines are arranged downstream of the speed reduction gear.

the axis of rotation of the first intermediate pinion is parallel to the longitudinal axis.

the axis of rotation of the second intermediate pinion is parallel to the longitudinal axis.

the axis of rotation of the output pinion is coaxial with the longitudinal axis.

the electric machine is annular.

the electric machine has a generally cylindrical shape.

The disclosure also relates to a turbomachine comprising an assembly having any of the preceding characteristics and an air inlet arranged below the speed reduction gear, in a vertical direction perpendicular to the longitudinal axis.

The disclosure also concerns an aircraft equipped with such a turbomachine.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

FIG. 1 shows an axial cross-section of a turbomachine equipped with a reduction mechanism, as described above.

Figure 2:
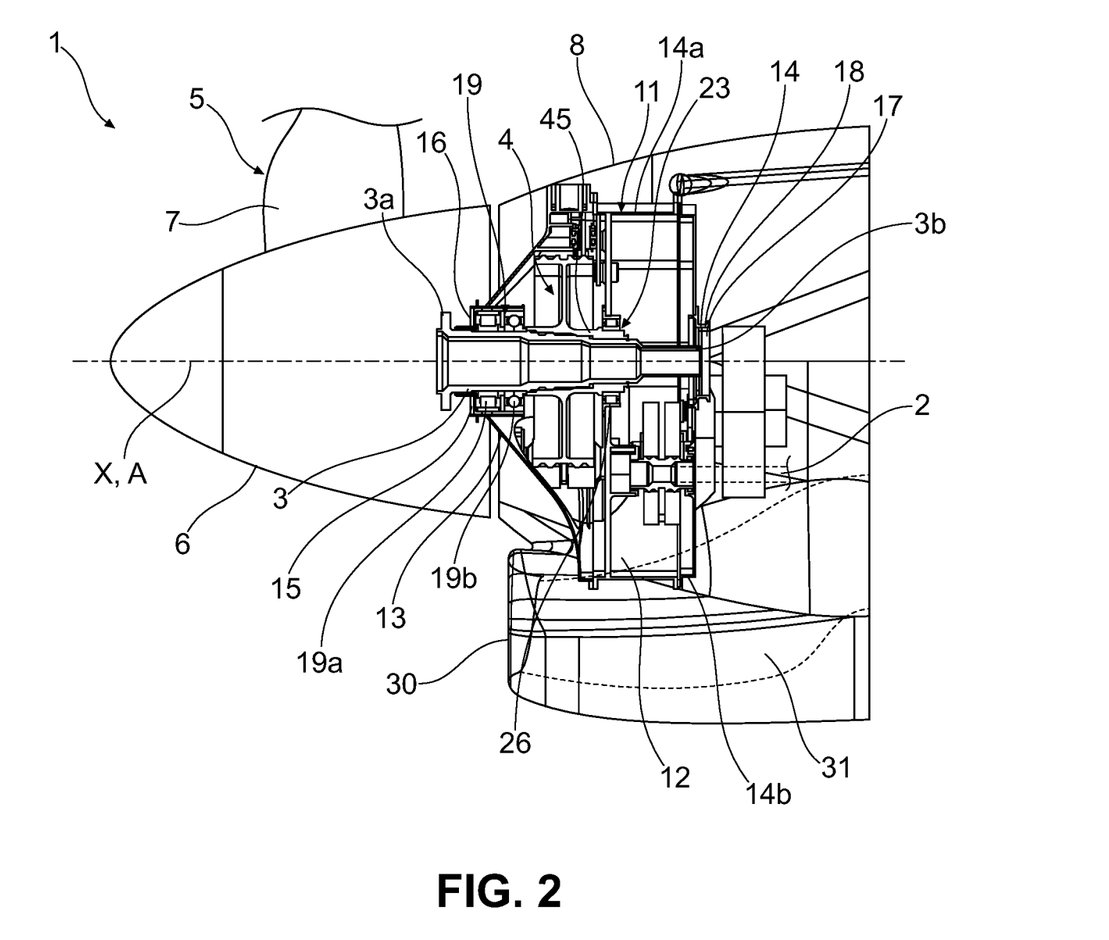
FIG. 2 illustrates an example of the arrangement of a reduction mechanism in a turbomachine according to the disclosure.

FIG. 2 shows a turbomachine 1 with a longitudinal axis X. The turbomachine 1 shown is a turboprop engine equipped with a single unducted propeller intended to be mounted on an aircraft. The turboprop may comprise a doublet of counter-rotating, unducted propellers. The turboprop engines are referred to as "open rotor" engines. Of course, the turbomachine can be a single flow or double flow turbojet engine.

The turbomachine comprises a power shaft 2 (shown dotted in FIG. 2), a propeller shaft 3 and a reduction gear mechanism. Advantageously, the reduction mechanism is a speed reduction gear 4 which is intended and configured to be driven by the power shaft 2 and to rotate the propeller shaft 3 at a different speed from that of the power shaft.

Advantageously, the speed of the power shaft 2 is higher than that of the propeller shaft 3. For example, the speed of the power shaft 2 is around 25,000 rpm, while the speed of the propeller shaft 3 is around 2,000 rpm. This allows the propeller shaft 3 to be driven efficiently for an effective propulsion of the aircraft.

The propeller shaft 3 has an axis of rotation A which is centered on the longitudinal axis X. Advantageously, the propeller shaft 3 extends between a first end 3a and a second end 3b.

Advantageously, the turbomachine comprises an unducted propeller 5 which is connected to the propeller shaft 3. The propeller shaft 3 is intended and configured to drive the propeller 5 in rotation in order to propel the aircraft. The propeller 5 comprises a cylindrical casing 6 which is attached to the first end 3a of the propeller shaft 3.

Each propeller 5 comprises blades 7 which are arranged regularly around the longitudinal axis X. The blades 7 comprise roots, each of which are housed in a housing provided in an annulus (not shown) and extends from this annulus. The annulus is centered on the longitudinal axis X and is secured in rotation with the cylindrical casing 6.

As can be seen in FIG. 2, the speed reduction gear 4 is positioned in the upstream portion of the turbomachine.

In the present disclosure, the terms "upstream" and "downstream" are defined in relation to the circulation of the gases in the turbomachine and here along the longitudinal axis X and in FIG. 2 from left to right.

The speed reduction gear 4 is arranged in an internal volume of a nacelle 8 where there is little space available. The nacelle 8 comprises the cylindrical casing 6 of the propeller. The nacelle 8 generally surrounds the gas generator of the turbomachine.

In particular, the turbomachine comprises a stator casing 11. The stator casing 11 is arranged to form an enclosure 12 surrounding the speed reduction gear 4. The stator casing 11 is advantageously independent of the turbomachine casings, such as the inlet casing of the turbomachine. The stator casing 11 is secured to the nacelle 8 of the turbomachine. A lubricant mist prevails in the enclosure 12. The propeller shaft 3 passes at least partly through the enclosure 12 along the longitudinal axis X.

Advantageously, but without limitation, the stator casing 11 comprises at least an upstream portion 13 and a downstream portion 14. The upstream portion 13 and the downstream portion 14 are separated from each other here. The upstream portion 13 of the stator casing 11 comprises a first opening 15 through which the propeller shaft 3 can pass. The first opening 15 is delimited by a cylindrical wall 16 centered on the longitudinal axis X.

The downstream portion 14 comprises a second opening 17 allowing at least part of the pitch change system 10 to pass through. The second opening 17 is delimited by a cylindrical skirt 18 which is centered on the longitudinal axis X.

The upstream portion 13 and the downstream portion 14 are attached to each other, for example using a radial flange and a bolted connection. The downstream portion 14 can be made in a single piece or in two segments 14a, 14b as shown in FIG. 2.

Figure 3:
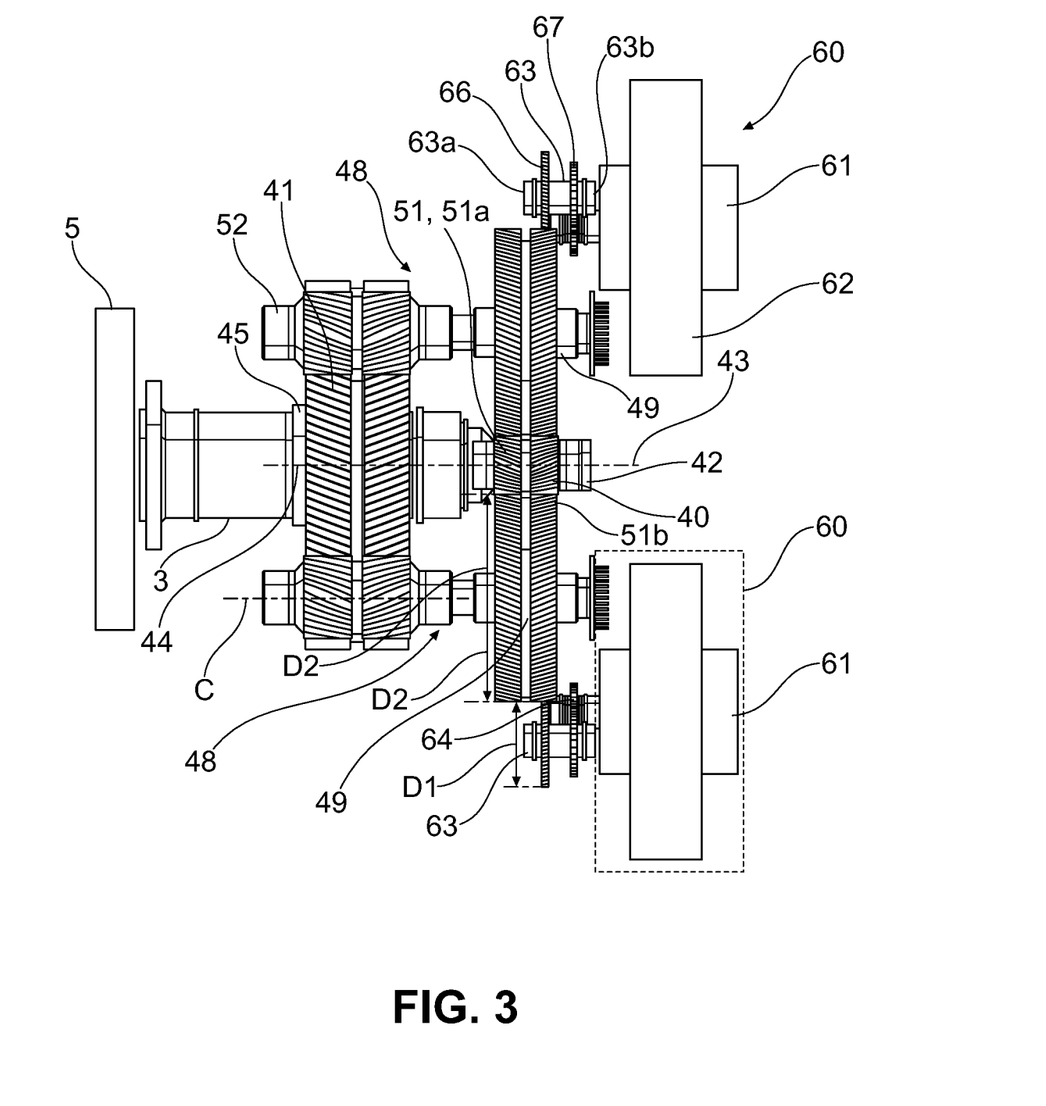
FIG. 3 is a bottom view of an example of the arrangement of a reduction mechanism and at least one electric machine according to the disclosure.

With reference to FIG. 3, the propeller shaft 3 is driven in rotation relative to the casing 11 by means of bearings. In this example, two upstream bearings 19 are mounted upstream of the enclosure 12. Advantageously, the two upstream bearings 19 are mounted upstream of the speed reduction gear 4. Each upstream bearing 19 comprises an internal ring secured to the propeller shaft 3 and an external ring secured to the cylindrical wall 16 of the casing. In the example shown, the first upstream bearing 19a comprises roller bearings and the second upstream bearing 19b comprises ball bearings.

Advantageously, propeller shaft 3 is also driven downstream by a downstream bearing 23. The downstream bearing 23 is mounted downstream of enclosure 12. More specifically, the downstream bearing 23 is mounted downstream of an output pinion 41, which will be described in more detail later. The downstream bearing 23 comprises an internal ring which is secured to a cylindrical shaft 45 of the output pinion 41. The downstream bearing 23 comprises an external ring which is secured to an annular wall 26 of the stator casing 11.

Advantageously, but without limitation, enclosure 12 is closed upstream by seals at the level of the upstream bearings 19 allowing the propeller shaft 3 to pass through, and downstream by seals at the level of the cylindrical skirt 18.

In FIG. 3, the speed reduction gear 4 comprises a gear train with intermediate transmission lines, also referred to as a "compound" reduction gear. The speed reduction gear 4 is also referred to by the acronym PGB for "Propeller Gear Box" or RGB for "Reduction Gear Box". The compound speed reduction gear requires a load balancing system to equalize the loads between intermediate lines.

The speed reduction gear 4 comprises an input pinion 40 and an output pinion 41 which are movable in rotation. The input pinion 40 is connected to the power shaft. Advantageously, the input pinion 40 is carried by a shaft 42 and is coaxial. In the present embodiment, the input pinion 40 has an input axis 43 which is parallel to the longitudinal axis X of the turbomachine. The power shaft 2 is coupled to the shaft 42 of the input pinion 40, for example, by means of splines, so that the power shaft 2 is secured to the input pinion 40. The power shaft 2 thus drives the input pinion 40 in rotation.

Advantageously, the power shaft 2 is a turbine shaft typically comprised in a turbomachine.

The output pinion 41 is connected to the propeller shaft 3. The connection is made using splines, for example, so that the propeller shaft 3 is secured to the output pinion 41. The output pinion 41 has an output axis 44 which is parallel to the input axis 43 of the input pinion 40. In particular, the output axis 44 coincides with that of the propeller shaft 3 (and with the longitudinal axis). In other words, the output pinion is movable in rotation about the axis 44 which is colinear with the longitudinal axis X. In other words, the input axis 43 of the input pinion 40 is offset, in this case radially, from the output axis 44 of the output pinion 41.

Figure 4:
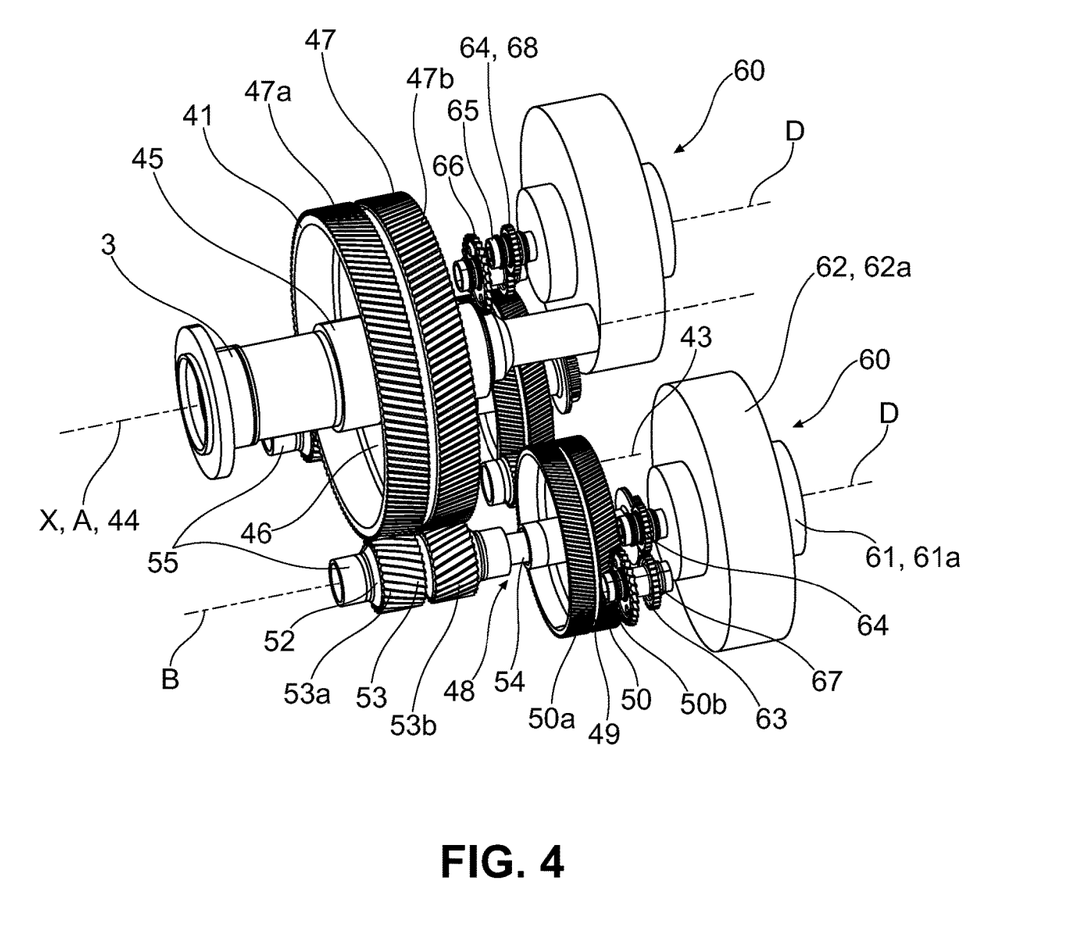
FIG. 4 is a perspective view of an example of a reduction mechanism cooperating with two electric machines according to the disclosure.

In FIG. 4, the output pinion 41 comprises in this example of embodiment a cylindrical shaft 45 extending along the output axis 44. The output pinion 41 comprises a rim 46 which extends radially around the cylindrical shaft 45 and carries at least one external toothing 47.

In FIGS. 3 and 4, the speed reduction gear 4 comprises torque transmission means 48 which are configured to transmit the torque from the input pinion 40 to the output pinion 41. In particular, the power transmitted by the input pinion 40 is distributed by the torque transmission means 48 before being transferred to the output pinion 41.

In this example, the torque transmission means 48 comprises two intermediate transmission lines 55. The two intermediate lines 55 are substantially parallel (more or less inclined by 5°) and are substantially identical. In another configuration example, the intermediate lines 55 can be inclined at an angle greater than 5°.

In FIG. 4 and advantageously, each intermediate transmission line 55 comprises a first intermediate pinion 49 mounted to rotate about an axis of rotation B. The axes of rotation of the intermediate pinions 49 are also parallel to the longitudinal axis. The two intermediate pinions 49 each comprise external toothing 50 which mesh with an external toothing 51 on the input pinion 40.

Figure 5:
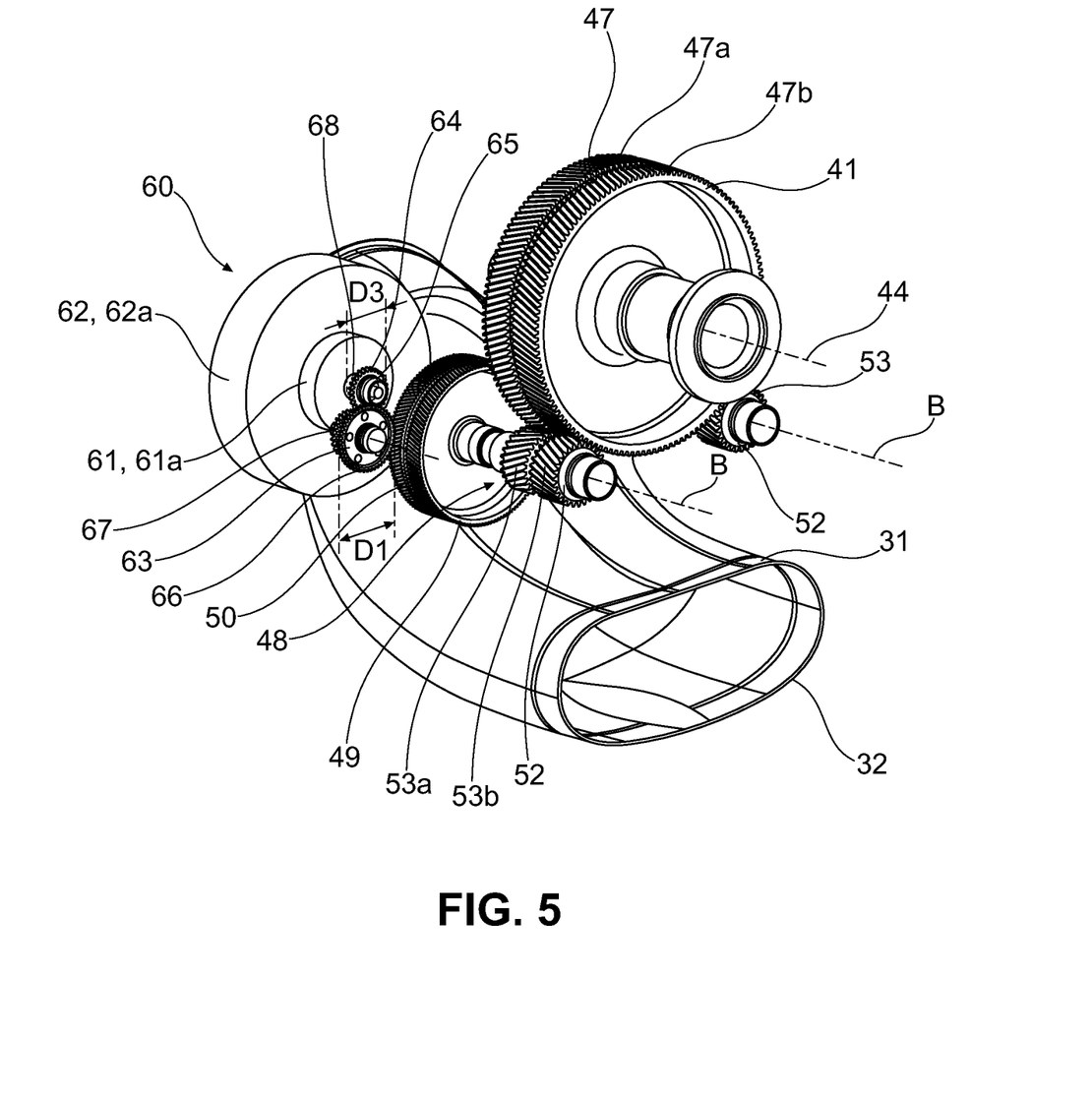
FIG. 5 is a perspective view of an example of the arrangement of an air inlet of a turbomachine according to the disclosure.

With reference to FIGS. 4 and 5, each intermediate transmission line 55 advantageously comprises a second intermediate pinion 52 mounted to rotate about an axis of rotation C. The latter is coaxial with a corresponding intermediate line 55. The axes of the second intermediate pinions 52 are also parallel to the longitudinal axis. The second intermediate pinions 52 each have an external toothing 53 which mesh with the external toothing 47 of the output pinion 41.

Advantageously, the first intermediate pinions 49 and the second intermediate pinions 52 are secured in rotation. In particular, the first pinion 49 and second pinion 52 of each intermediate line 55 are carried by a shaft 54. Advantageously, but without limitation, the shaft 54 extends between a first end and a second end. Each first intermediate pinion 49 is arranged at the first end of the shaft 54 and each second intermediate pinion 52 is arranged at the second end of the shaft 54.

Advantageously, the second intermediate pinions 52 are arranged upstream of the first intermediate pinions 49.

The toothing of the pinions 40, 41, 49, 52 can be straight (parallel to the longitudinal axis), helical, or herringbone. Similarly, the toothing of the pinions can be split into several propellers for reasons of operation, assembly, manufacture, inspection, repair, or replacement.

With reference to FIGS. 4 and 5, at least one of the input pinions, output pinions, first intermediate pinions, and second intermediate pinions is split into two half-segments:
  a first segment consisting of a rim which carries the first propeller of the toothing. This first propeller meshes with that of another pinion of the speed reduction gear;
  a second segment consisting of a rim which carries the second propeller of the toothing. This second propeller meshes with that of another pinion.

In the present example of embodiment, the input pinion 40 comprises two half-segments carrying a first propeller 51a and a second propeller 51b respectively. The first propeller 51a meshes with a first propeller 50a of each of the first intermediate pinions 49 and the second propeller 51b meshes with a second propeller 50b of each of the first intermediate pinions 49. The output pinion 41 comprises two half-segments carrying a first propeller 47a and a second propeller 47b respectively. The first propeller 47a meshes with a first propeller 53a of each of the second pinions 52 and the second propeller 47b meshes with a second propeller 53b of each of the second intermediate pinions 52.

Advantageously, the direction of the first propeller is different from that of the second propeller. The directions are opposite.

Of course, each of the pinions may be formed from a single piece.

As illustrated in FIGS. 2 to 7, the speed reduction gear 4 cooperates with at least one electric machine 60. More specifically, the electric machine 60 is located downstream of the speed reduction gear 4 and in the volume available for the speed reduction gear 4. This configuration allows to limit the overall dimension in the turbomachine. The electric machine 60 is configured to provide electrical power to the propeller shaft and to the aircraft (generator mode). Advantageously, the electric machine can also draw mechanical power from the propeller shaft (motor mode). To this end, the aircraft comprises an electrical circuit (not shown) which is connected, on the one hand, to the electric machine 60 and, on the other hand, to various items of equipment on the aircraft.

In this example, there are two electric machines 60. The combination of two electric machines allows to increase the electrical power available to supply the various items of equipment.

Referring to FIG. 4, each electric machine 60 comprises a rotor 61 and a stator 62. The rotor 61 is configured to be driven in rotation about an axis of rotation D. The axis of rotation is parallel to the longitudinal axis. In particular, the axis of rotation is also parallel to the axis of rotation of the intermediate lines 55. The stator 62 is connected to the casing 11 of the turbomachine.

An advantageous characteristic is that the first intermediate pinion 49 of the speed reduction gear is designed and configured to drive the rotor 61 of each electric machine 60 in rotation.

To this end, the speed reduction gear 4 comprises at least one drive wheel 63 driven, on the one hand, by a first intermediate pinion 49 and driving, on the other hand, a complementary pinion 64. In this example, there are advantageously two drive wheels 63. In other words, there are also two complementary pinions 64, each driven via a drive wheel 63.

Each complementary pinion 64 is advantageously mounted on a rotor 61. The complementary pinion 64 comprises an axis parallel to and coaxial with the axis of rotation of the rotor D.

Advantageously, each rotor 61 shown schematically in the figures has a cylindrical body 61a with a straight circular cross-section. The cylindrical body 61a may be solid or hollow.

Advantageously, but without limitation, the complementary pinion 64 is formed in a single piece with the rotor 61. In this case, the complementary pinion 64 is mounted radially outside a shaft 65 extending the body of the rotor 61. Alternatively, the complementary pinion 64 is fitted to the shaft 65 of the rotor 61.

Each drive wheel 63 comprises a first external toothing 66 meshing with the external toothing 50 of a complementary pinion 64. Advantageously, but not restrictively, the external diameter D1 (shown in FIGS. 3 and 5) of the first external toothing 66 is smaller than the external diameter D2 (also shown in FIG. 3) of the first complementary pinion 49.

Advantageously, each drive wheel 63 comprises a second external toothing 67 meshing with an external toothing 68 of a complementary pinion 64. In this embodiment, the external diameter D3 (shown in FIG. 5) of the external toothing 68 is smaller than the diameter D1 of the first external toothing 66.

As shown in FIG. 3, each drive wheel 63 extends between a first end 63a and a second end 63b. The first external toothing 66 is arranged at the level of the first end 63a and the second external toothing 67 is arranged at the level of the second end 63b.

The axis of rotation of each drive wheel 63 is thus offset from the axes of the input and output pinions 40, 41.

Advantageously, the external toothings of each drive wheel 63 remain in the same radial plane. In general, the pinions do not move along the longitudinal axis.

The stator 62 of the electric machine 60 extends radially outside the rotor 61. Advantageously, the stator 62 comprises a cylindrical body 62ab coaxial with the axis of the rotor 61. In this example, the stator 62 is attached to the casing 11. The stator 62 is hollow and houses the rotor 61 extending inside it. In particular, the cylindrical body 62a also comprises an internal bore.

Of course, the stator 62 and rotor 61 can have different shapes as long as they are complementary and can be easily integrated into the available volume of the turbomachine.

Figure 6:
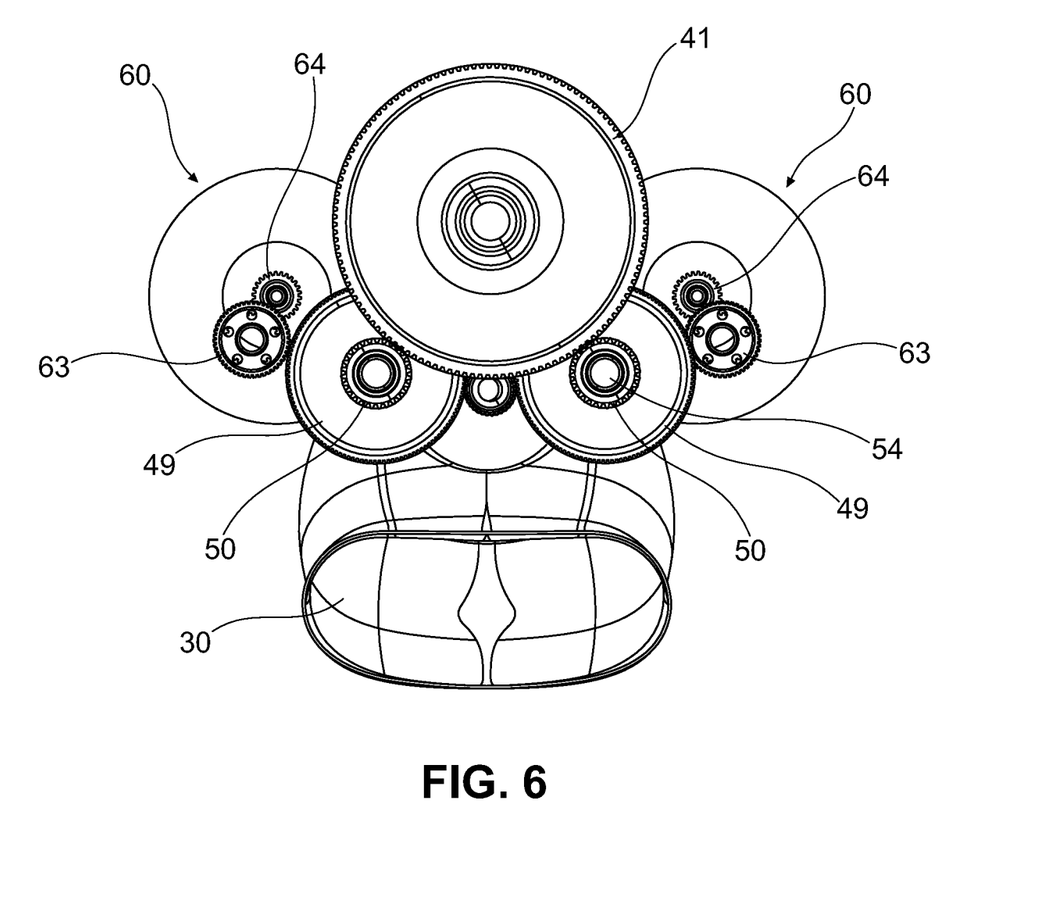
FIG. 6 is a front view of the reduction mechanism shown in FIG. 5.
Figure 7:
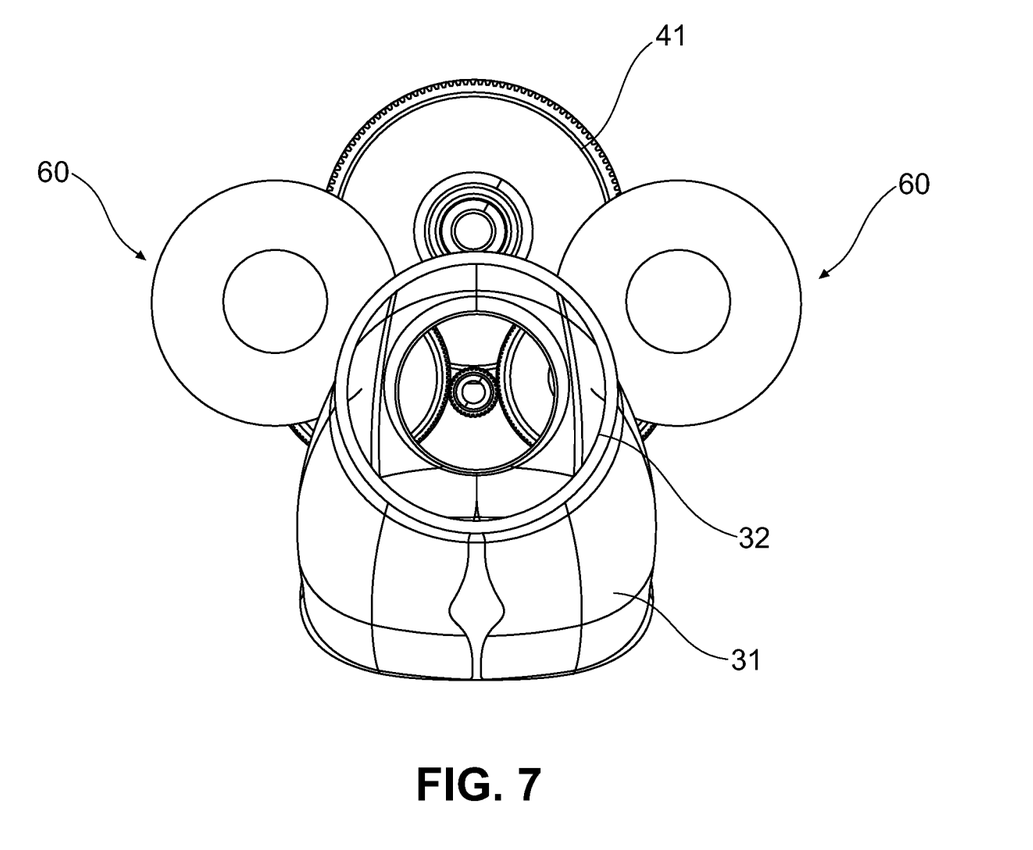
FIG. 7 is a rear view of the reduction mechanism shown in FIG. 5.

As can be seen in FIGS. 5, 6 and 7, the turbomachine also comprises an air inlet 30 which is arranged below the speed reduction gear 4 in a vertical direction perpendicular to the longitudinal axis. Advantageously, the air inlet 30 is extended downstream by an air sleeve 31 which extends below the speed reduction gear 4. The air inlet 30 is defined in a radial plane which is arranged upstream of the outlet pinion 41. Advantageously, the air sleeve 31 is S-shaped. The air sleeve 31 has an air outlet 32 which is defined in a radial plane located downstream of the electric machines 60. The electric machines 60 and the speed reduction gear 4 are located in particular in a recessed area of the air sleeve 31 and delimit the available volume. This will allow different types of power to be provided without impact on the overall dimension in the volume where the speed reduction gear is located and also the overall dimension within the speed reduction gear 4.

Each electric machine 60 can operate in either motor mode or generator mode, as explained above.

In the case where each electric machine 60 is operating in generator mode (the propeller shaft 3 or the turbomachine sends power towards the electric machines 60), the input pinion 40 meshes with the first intermediate pinions 49 as seen in FIGS. 3, 4, 6 and 7. The rotation of the first intermediate pinions 49 drives the rotation of the second intermediate pinions 52. The rotation of the first intermediate pinions 49 also drives the rotation of the complementary pinions 64 of each rotor 61 via the drive wheels 63. Similarly, the second intermediate pinions 52 mesh with the output pinion 41 which is coupled to the propeller shaft 3.

In the case where each electric machine 60 is operating in motor mode (the electric machines send power towards the propeller shaft 3), the complementary pinions 64 of each rotor 61 are driven in rotation and drive the drive wheels 63 via the external toothings 68 which mesh with the second toothings 67. The first external toothings 66 of the drive wheels 63 (which also carry the first toothing 66) drive the output pinion 41 via the first and second intermediate pinions 49, 52.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An assembly for an aircraft turbomachine, the assembly comprising:
    a power shaft;
    a propeller shaft centered on a longitudinal axis;
    at least one speed reduction gear comprising an input pinion connected to the power shaft and an output pinion connected to the propeller shaft; and
    two electric machines, each configured to provide electrical power to the propeller shaft or to draw mechanical power from the propeller shaft, each electric machine comprising a rotor and a stator, the stator configured to be connected to a casing of the turbomachine, wherein the speed reduction gear comprises two intermediate transmission lines which are substantially parallel and which are configured to transmit the torque from the input pinion to the output pinion, each rotor being driven in rotation respectively by a pinion of an intermediate line.

2. The assembly of claim 1, wherein the input pinion comprises an input axis offset with respect to an output axis of the output pinion which is coaxial with the longitudinal axis.

3. The assembly of claim 1, wherein each intermediate transmission line comprises a first intermediate pinion mounted to rotate about an axis of rotation and comprising a first toothing intended to mesh with an external toothing of the input pinion.

4. The assembly of claim 1, wherein each intermediate transmission line comprises a second intermediate pinion mounted to rotate about an axis of rotation and comprising a second toothing intended to mesh with an external toothing of the output pinion.

5. The assembly of claim 1, wherein the input pinion meshes with two first intermediate pinions of the intermediate transmission lines and the output pinion meshes with two second intermediate pinions of the intermediate transmission lines wherein each first intermediate pinion and each second intermediate pinion comprises a first propeller and a second propeller each meshing with a corresponding propeller of the input pinion and of the output pinion.

6. The assembly of claim 1, wherein the speed reduction gear comprises at least two drive wheels which are each, on the one hand, driven in rotation respectively by the first intermediate pinion of an intermediate transmission line and which, on the other hand, driven in rotation a complementary pinion mounted on each rotor, the complementary pinion of the rotor comprising an axis of rotation parallel to the input axis and parallel to the axis of the drive wheel.

7. The assembly of claim 6, wherein each drive wheel comprises a first external toothing meshing with an external toothing of a first intermediate pinion and a second external toothing meshing with an external toothing of the complementary pinion.

8. The assembly of claim 1, wherein the stator extends radially outside the rotor.

9. The assembly of claim 1, wherein the electric machines are arranged downstream of the speed reduction gear.

10. The assembly of claim 1, wherein each electric machine is annular.

11. A turbomachine comprising:
an assembly according to claim 1; and
an air inlet arranged below the speed reduction gear in a vertical direction perpendicular to the longitudinal axis.

* * * * *